(12) United States Patent
Pessot et al.

(10) Patent No.: US 12,180,641 B2
(45) Date of Patent: Dec. 31, 2024

(54) LAUNDRY WASHING MACHINE

(71) Applicant: Electrolux Appliances Aktiebolag, Stockholm (SE)

(72) Inventors: Marco Pessot, Porcia (IT); Simone Trangoni, Porcia (IT); Carlo Antonio Leone, Porcia (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 290 days.

(21) Appl. No.: 17/862,883

(22) Filed: Jul. 12, 2022

(65) Prior Publication Data

US 2023/0018094 A1  Jan. 19, 2023

(30) Foreign Application Priority Data

Jul. 19, 2021 (EP) .................................. 21186282

(51) Int. Cl.
| | | |
|---|---|---|
| *D06F 39/10* | (2006.01) | |
| *B01D 29/33* | (2006.01) | |
| *B01D 35/02* | (2006.01) | |
| *B01D 35/30* | (2006.01) | |
| *B01D 39/16* | (2006.01) | |
| *D06F 23/02* | (2006.01) | |
| *D06F 39/08* | (2006.01) | |

(52) U.S. Cl.
CPC ........... *D06F 39/10* (2013.01); *B01D 29/336* (2013.01); *B01D 35/02* (2013.01); *B01D 35/301* (2013.01); *B01D 39/16* (2013.01); *D06F 23/02* (2013.01); *D06F 39/085* (2013.01); *B01D 2201/305* (2013.01)

(58) Field of Classification Search
CPC ...... D06F 39/10; D06F 39/083; D06F 39/085; D06F 2103/42; D06F 2105/34; B01D 29/336; B01D 35/02; B01D 35/301
See application file for complete search history.

(56) References Cited

U.S. PATENT DOCUMENTS

| | | |
|---|---|---|
| 2,343,743 A | 3/1944 | Breckenridge |
| 2,360,278 A | 10/1944 | Robertson |
| 2,586,508 A | 2/1952 | Brotman |
| 3,959,138 A | 5/1976 | Nichols |

(Continued)

FOREIGN PATENT DOCUMENTS

| | | |
|---|---|---|
| CN | 208533177 U | 2/2019 |
| EP | 3031977 A1 | 6/2016 |

(Continued)

OTHER PUBLICATIONS

European Communication for European Application No. 13183926.8, dated Mar. 21, 2018, 9 pages.

*Primary Examiner* — Joseph L. Perrin
(74) *Attorney, Agent, or Firm* — Bradley Arant Boult Cummings LLP

(57) ABSTRACT

A laundry washing machine having a washing tub in which a drum for receiving laundry is arranged, a filter, and an outlet duct fluidically connecting the washing tub and the filter. The filter comprises a filter seat and a filter body insertable/inserted on the filter seat, and the filter body is built in a once-piece design as a monolithic body with two hemi-shells that are connected to each other by at least one deformable connection element.

19 Claims, 9 Drawing Sheets

(56) References Cited

U.S. PATENT DOCUMENTS

| | | | |
|---|---|---|---|
| 3,984,330 A | 10/1976 | Nichols | |
| 4,125,003 A | 11/1978 | Wasemann | |
| 4,485,645 A | 12/1984 | Mulder et al. | |
| 4,580,421 A | 4/1986 | Babuin et al. | |
| 5,660,063 A | 8/1997 | Lee et al. | |
| 5,989,418 A * | 11/1999 | Shin | D06F 39/10 |
| | | | 210/167.01 |
| 6,931,891 B2 | 8/2005 | Killane | |
| 6,938,627 B2 | 9/2005 | Jung et al. | |
| 7,243,512 B2 | 7/2007 | Kim et al. | |
| 7,418,842 B2 | 9/2008 | Cimetta et al. | |
| 7,431,774 B2 | 10/2008 | Kim | |
| 7,891,218 B2 | 2/2011 | Shikamori et al. | |
| 7,926,310 B2 | 4/2011 | Yoo et al. | |
| 8,038,876 B2 | 10/2011 | Yoo et al. | |
| 8,511,116 B2 | 8/2013 | Nakamura et al. | |
| 8,511,324 B2 | 8/2013 | Komoto et al. | |
| 8,516,859 B2 | 8/2013 | Lalonde et al. | |
| 8,844,324 B2 | 9/2014 | Tobi et al. | |
| 8,881,555 B2 | 11/2014 | Kim et al. | |
| 9,127,394 B2 | 9/2015 | Tietz et al. | |
| 9,238,884 B2 | 1/2016 | Tobi et al. | |
| 9,758,918 B2 | 9/2017 | Hwang | |
| 9,885,140 B2 | 2/2018 | Tietz et al. | |
| 10,443,177 B2 | 10/2019 | Kim et al. | |
| 10,570,554 B2 | 2/2020 | Iwang | |
| 2008/0155759 A1 | 7/2008 | Mantle et al. | |
| 2011/0107798 A1 | 5/2011 | Kawaguchi et al. | |
| 2016/0305059 A1* | 10/2016 | Xu | D06F 39/006 |
| 2017/0137987 A1* | 5/2017 | Xu | D06F 39/083 |
| 2017/0159228 A1* | 6/2017 | Lv | B01D 37/03 |
| 2017/0284012 A1* | 10/2017 | Lv | D06F 39/10 |
| 2018/0171532 A1 | 6/2018 | Cheng et al. | |
| 2018/0313023 A1* | 11/2018 | Piekarski | B01D 33/11 |
| 2019/0099055 A1 | 4/2019 | Feddema et al. | |
| 2020/0179846 A1* | 6/2020 | Zupan | B01D 61/147 |
| 2020/0277719 A1* | 9/2020 | Driussi | F04B 43/12 |
| 2020/0370231 A1* | 11/2020 | Contarini | D06F 39/083 |
| 2021/0047768 A1* | 2/2021 | Contarini | F04D 29/486 |
| 2022/0290357 A1* | 9/2022 | Bhavsar | D06F 39/085 |

FOREIGN PATENT DOCUMENTS

| | | |
|---|---|---|
| JP | 5555189 U | 4/1980 |
| JP | 2018061751 A | 4/2018 |
| KR | 20090009130 U | 9/2009 |

* cited by examiner

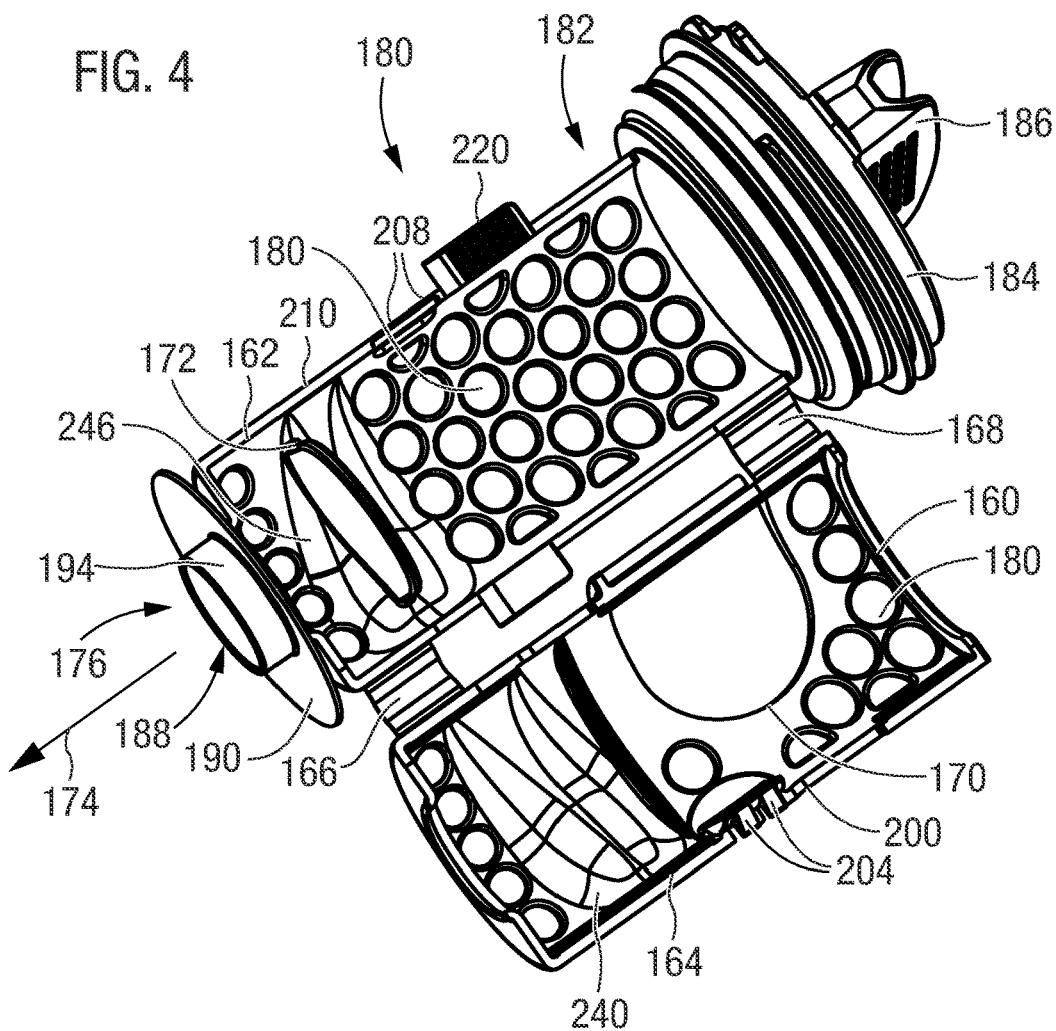
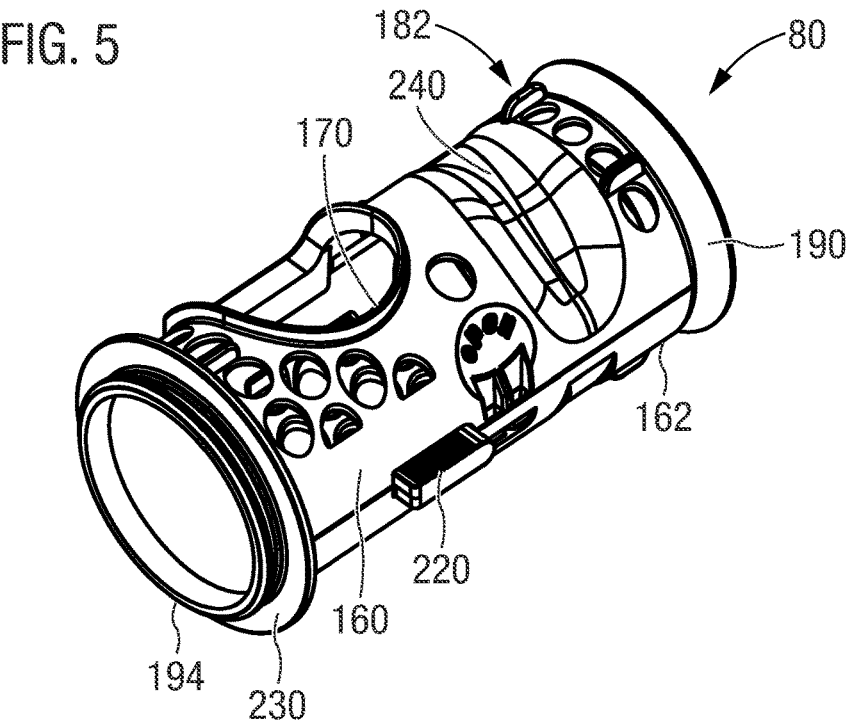

LAUNDRY WASHING MACHINE

This application claims priority to European Patent Application No. 21186282.6, filed on Jul. 19, 2021, which is incorporated herein by reference.

FIELD OF THE INVENTION

The present invention concerns the field of laundry washing machines. In particular, the present invention relates to laundry washing machines with a filter.

BACKGROUND ART

Laundry washing machines in households, also called domestic washing machines, are well-known and usually are used for washing laundry. Washing machines usually comprise washing tubs in which a rotatable drum is housed for receiving goods to be washed, usually laundry.

Laundry washing or washing drying machines generally comprise an external casing provided with a washing tub which contains a rotatable perforated drum where the laundry is placed. A loading/unloading door ensures access to the drum. Laundry treatment appliances typically comprise a water supply unit and a products supply unit, preferably a drawer, for the introduction of water and washing/rinsing products (i.e. detergent, softener, rinse conditioner, etc.) into the tub. Known laundry treatment appliances are also provided with water draining devices that may operate during different phases of the washing program to drain the dirty water.

According to the known art, a complete laundry treating program typically includes different phases during which the laundry to be washed is subjected to adequate treatments. A treating cycle usually comprises a main washing phase during which the laundry is treated by means of water and a detergent. The water is typically heated to a predetermined temperature based on the washing program selected by the user. It is also possible that hot water is introduced into the tub from the hot water mains. During the main washing phase, the drum is rotated, so as to apply also a mechanical cleaning action on the laundry. At the end of the main washing phase the drum is typically rotated at high rotational speed, so in such a way that dirty washing liquid (i.e. water mixed with detergent) is extracted from the laundry, and this dirty washing liquid is drained to the outside by the water draining devices.

Usually at the bottom of the washing tub a draining device is arranged for draining the washing liquid from the tub in order to either feed back the washing liquid into the washing tub again, often being heated by a heating element arranged in or near the tub bottom, in a closed circuit or circulation mode or to drain the washing liquid out of the washing machine into a sewage conduit, in an open circuit, when it is not needed any more. Usually the washing tub has a sump at the tub bottom which is in fluid connection to the draining device. A water level detector is often provided to detect the water level in the drum. The water level detector is typically realized by means of an air chamber connected to a pipe. A filter is usually provided between a tub outlet and a draining hose which is configured to transport washing liquid or water to the outside of the appliance. The filter removes fluff and dirt and contaminating particles from the water/washing liquid and holds them within the filter housing.

In known laundry washing machines, the manufacturing of the filter housing is cost-intensive and its handling during cleaning and exchange are inconvenient for the user.

SUMMARY OF THE INVENTION

The aim of the invention is therefore to provide a washing machine with a cheaper filter, which is easier to manufacture.

It is a further aim of the invention to provide a laundry washing machine with an improved filtration efficiency.

It is a further aim of the invention to provide a laundry washing machine with a filter allowing a user-friendly service.

The invention in a first aspect therefore relates to a laundry washing machine comprising a washing tub in which a drum for receiving laundry is arranged, further comprising an outlet duct and a filter, the outlet duct being configured to fluidically connect the washing tub and the filter, whereby the filter comprises a filter seat and a filter body insertable/inserted on the filter seat, whereby the filter body is built in a once-piece design as a monolithic body with two hemi-shells which are connected to each other by at least one deformable connection element.

The technical effect thereof is that shells belong to the same component and at the same time they can be bent with respect to each other.

Preferred embodiments of the invention are described in relation to the dependent claims and the description of the enclosed drawings.

The invention is based on the consideration that the filter is an important component in a laundry washing machine. Its body should function reliably, and a simple manufacturing process is desirable.

Applicant has found that these demands can be fulfilled by a filter which comprises one monolithic filter body with two hemi-shells which are connected by one or more deformable elements. Therefore, only one part needs to be produced and installed in the respective filter seat. Moreover, the shape of each hemi-shell allows an easier manufacturing process being each hemi-shell free of undercuts, i.e. simplifying a moulding tool-process.

The hemi-shells can also be denoted by semi shells. The technical effect of the design if the monolithic body with two semi shells connected each other by deformable connection elements is that the shells, having an easy manufacturing shape, can be bent with respect to each other, forming the filter body, the latter having a final shape quite complicated to monolithically manufacture with the known common techniques, i.e. die casting, thermoforming, moulding, etc.

The monolithic body preferably comprises a cylindrical shape when the two hemi-shells are arranged in a closed state. Each of the hemi-shells advantageously is built with a shape of half of a hollow cylinder. The cross section perpendicular to its axial axis therefore preferably is half of a full circle with the perimeter being a semi-circle comprising 180 degrees.

Preferably the at least one deformable connection element is built as a lip.

In a preferred embodiment two lips are provided, respectively arranged at opposing axial ends of the hemi-shells.

The monolithic body is preferably made of plastic. Preferably, the monolithic body is made of a plastic and has a particular shape configured to be deformable on the connection element.

Advantageously, each of the two hemi-shells comprises at least one closure device, whereby said at least one closure device (208) provided on one hemi-shell (162) is built to interact with a respective closure device (204) provided on the other hemi-shell (164). Said closure devices (204, 208)

are built to interact each other, keeping said hemi-shells (162, 164) in a closed position.

The filter seat preferably comprises an outlet port, which preferably is coaxial with the filter body, whereby the filter body at an end which faces the suction port of a pump, especially a discharge pump, comprises an integrated disk. Preferably, the filter body has a cylindrical shape and the outlet port as well as the integrated disk are provided at one axial extremity (the same extremity) of said body.

The integrated disk is preferably built of flexible material.

Preferably a safety collar is provided at an end of the filter body which faces the suction port of a pump, especially a discharge pump. By the safety collar entrance of elongated bodies into the filter is prevented.

The safety collar preferably protrudes from the integrated disk in axial direction.

The filter seat advantageously laterally comprises at least one outlet port, whereby in front of the outlet port a recess is provided on the filter body when it is on its mounting position, thereby improving the fluid flow.

Advantageously, the recess is provided at the external wall of at least one hemi-shell.

Preferably, the filter body, when the two hemi-shells are connected to each other, comprises a cylindrical shape.

The recess preferably comprises a portion of the external wall of the hemi-shell that is closer to the cylindrical filter body axis than the rest of the hemi-shell external wall. The presence of the recesses associated with a non-perforated area allows the water flowing in front of the outlet port to deviate toward said outlet decreasing the liquid turbulence.

The laundry washing machine in a preferred embodiment comprises a first recirculation pump and a second recirculation pump, whereby the seat comprises laterally arranged two suction ports connected to the recirculation pumps.

The filter advantageously comprises a cap which is rotatable connectable with respect to the filter body and is configured to assemble the filter body to the filter seat. Preferably, the filter body is cylindrical and the cap is provided at an axial end of said body, preferably at the opposed end with respect to the integrated disk and/or the safety collar.

The invention in a second aspect relates to a filter for filtering contaminants from liquid in a laundry washing machine, the filter comprising a filter body with a filter inlet and a filter outlet, whereby the filter body is built in a once-piece design as monolithic body with two hemi-shells which are connected to each other by at least one elastic connection element.

Preferably the filter body at its filter inlet comprises an integrated disk.

Advantageously a safety collar is provided at the filter inlet.

The features of the filter which are specified in the preferred embodiments of the laundry washing machines also correspond to features of preferred embodiments of the filter. The filter features of washing machine claims can be carried over and hereby are disclosed as features of the filter when claimed alone.

The advantages of the invention are especially as follows. With a single monolithic filter body, the manufacturing process is simplified, and costs are reduced. The design with two connected hemi-shells allows a cheaper manufacturing process, as well as a convenient handling of the filter body, especially for opening or closing the body. With closure devices arranged on the respective hemi-shells which engage in a closed position of the two hemi-shells. A secure mounting of the filter body in the filter seat can be assured.

BRIEF DESCRIPTION OF THE DRAWINGS

Further features and advantages of the present invention shall become clearer from the following detailed description of some of its preferred embodiments, made with reference to the attached schematic drawings and given as an indication and not for limiting purposes.

In particular, the attached drawings are included to provide a further understanding of the invention and are incorporated in and constitute a part of this specification. The drawings together with the description explain the principles of the invention. In the drawings, corresponding characteristics and/or components are identified by the same reference numbers. In these drawings:

FIG. 4 shows a filter in an open configuration in a perspective view;

FIG. 5 shows the filter according to FIG. 4 in a closed configuration in a perspective view:

Same parts are labelled in all figures with identical reference numerals.

DESCRIPTION OF EXEMPLARY EMBODIMENTS

Figure 1:
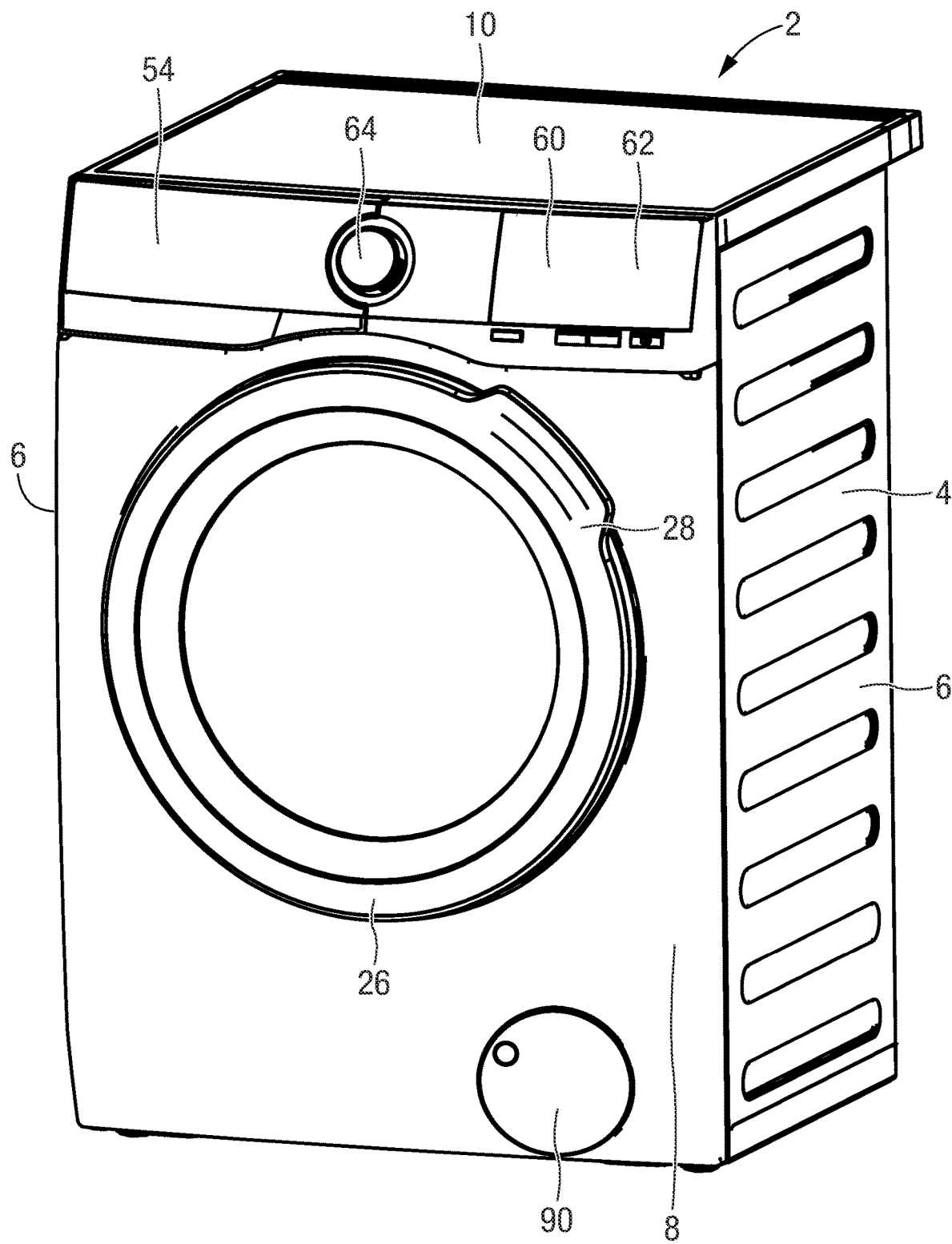
FIG. 1 shows a laundry washing machine in a preferred embodiment in a frontal perspective view.
Figure 2:
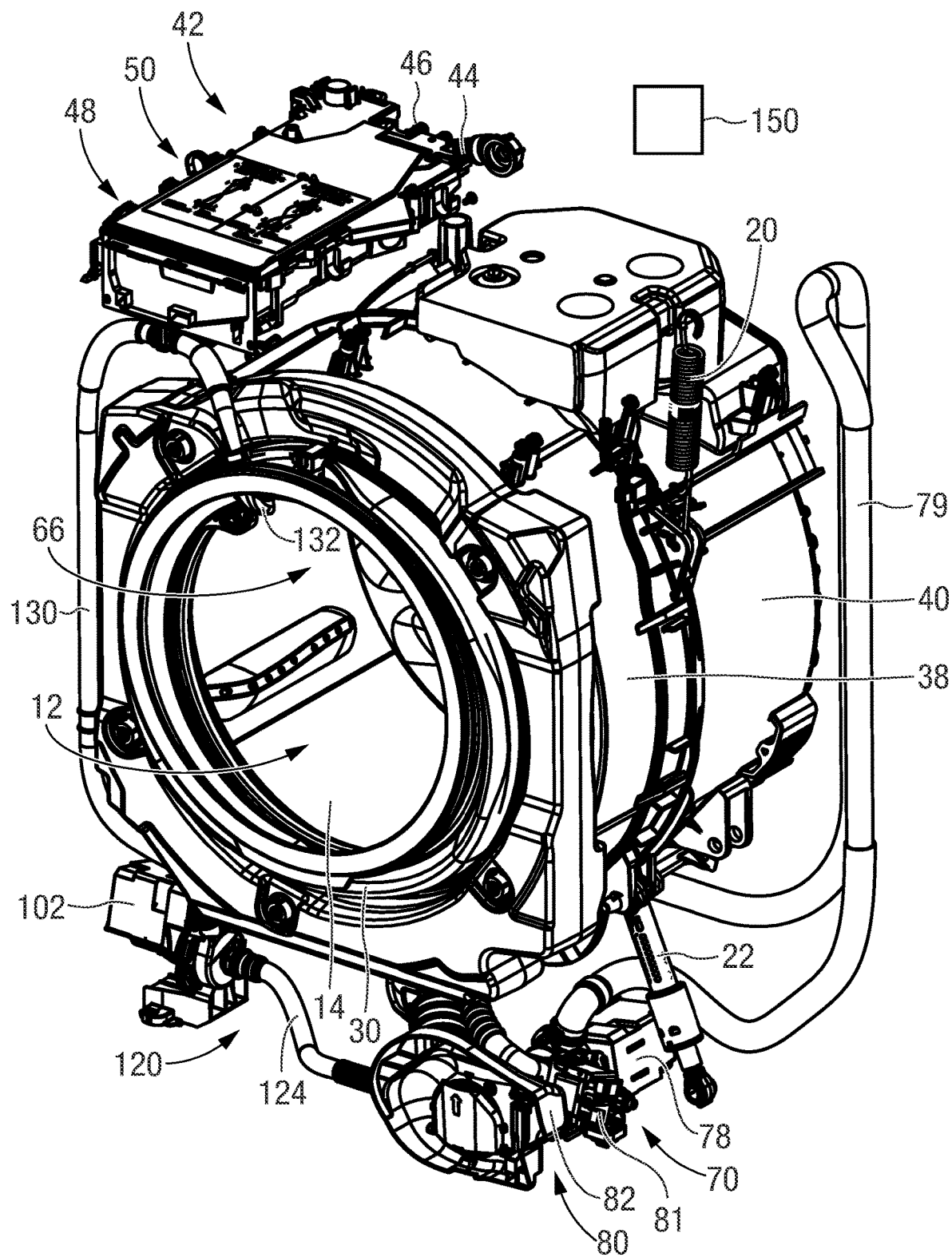
FIG. 2 shows the laundry washing machine according to FIG. 1 with the casing removed in a first perspective view.
Figure 3:
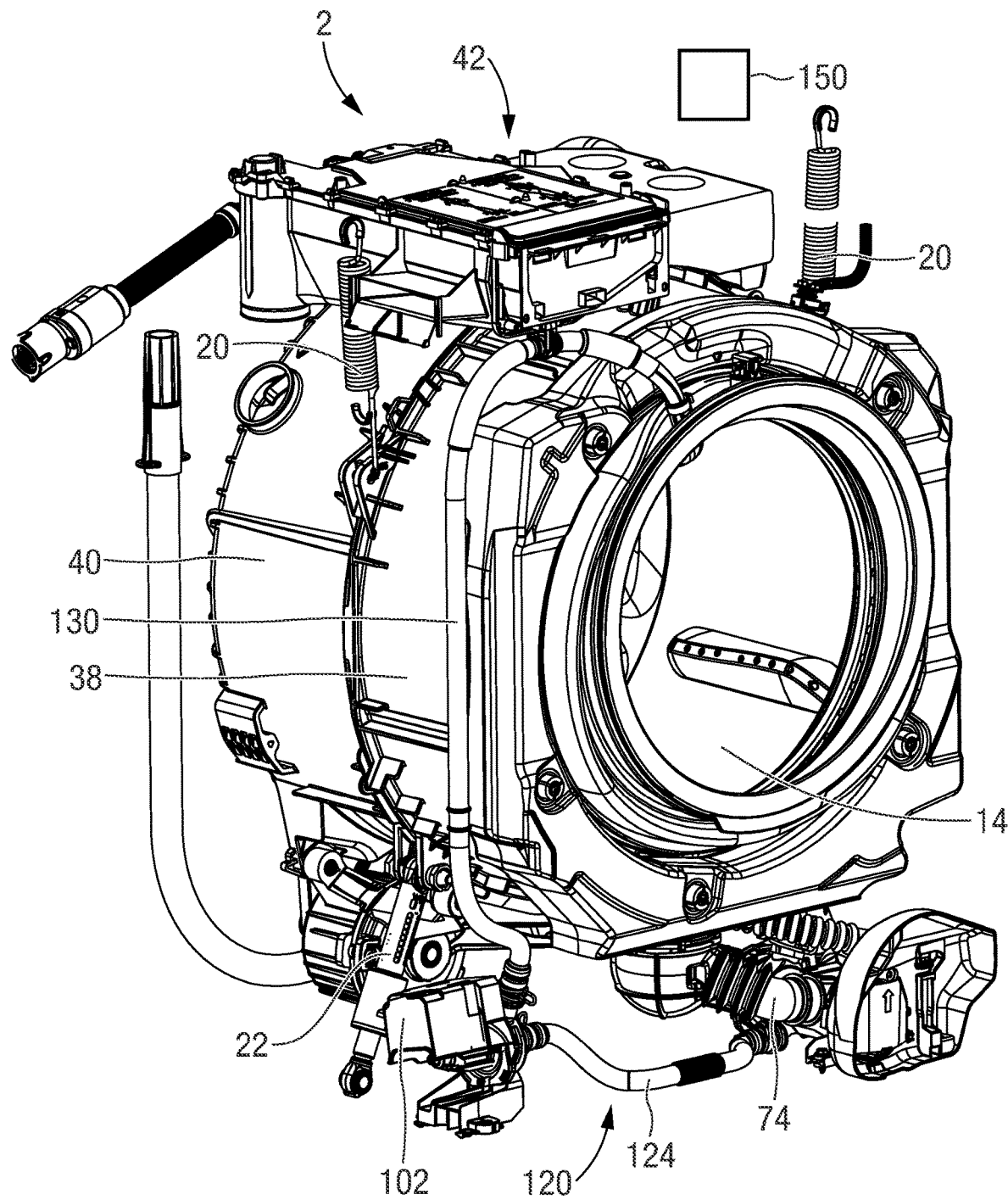
FIG. 3 shows the laundry washing machine according to FIG. 1 with the casing removed in a second perspective view.
Figure 6:
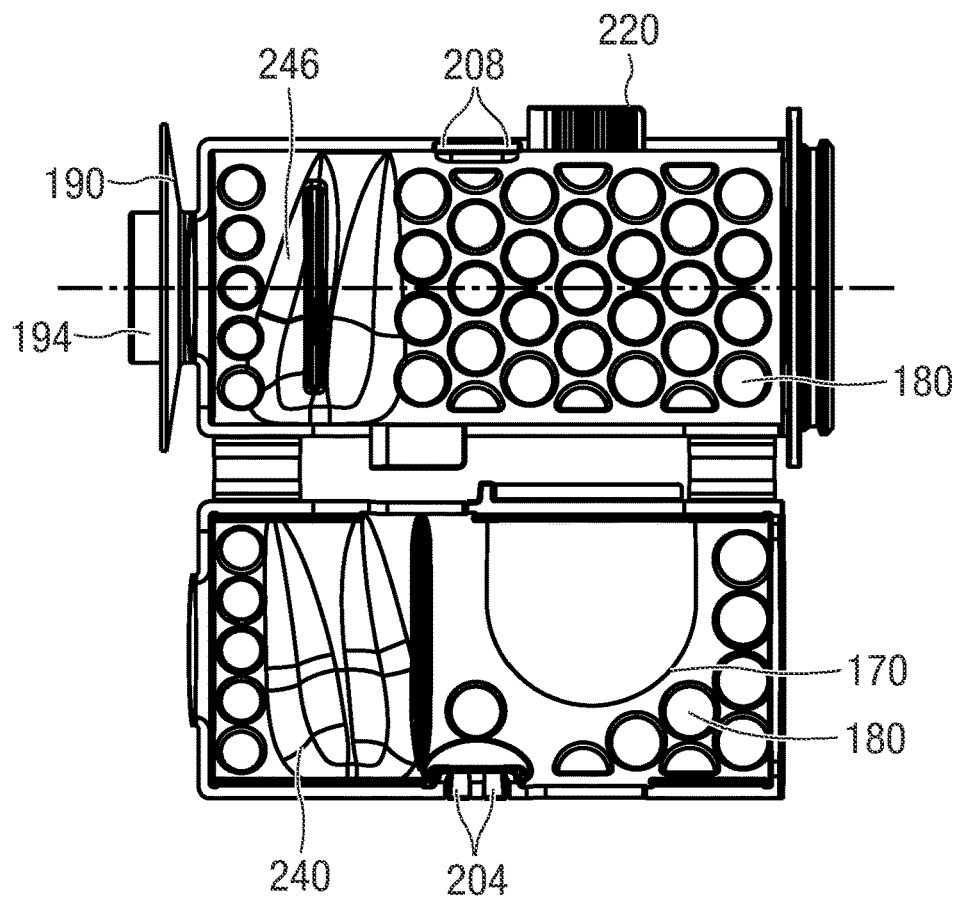
FIG. 6 shows the filter according to FIG. 4 in a top view in open configuration.

With reference to FIGS. 1, 2 and 3, a front-loading laundry washing machine 2 is shown which comprises an external housing or casing 4 comprising two side walls 6, a front wall 8, a back wall (not shown) and a top plate 10. Inside casing 4, a washing tub 12 is provided which contains a perforated washing drum 14 into which the laundry to be treated can be loaded. The tub 12 and drum 14 have both preferably an essentially cylindrical shape. Tub 12 is preferably suspended in a floating manner inside casing 4, advantageously by means of a number of coil springs 20 and shock absorbers 22.

Casing 4 is provided with a door 26 for loading/unloading of laundry with a handle 28 for operating the door 26. The drum 14 is advantageously rotated by an electric motor (not shown) which preferably transmits the rotating motion to a shaft of the drum 14, advantageously by means of a belt/pulley system. In a different embodiment, the motor can directly be associated with the shaft of the drum 14. Tub 12 is preferably connected to casing 4 by means of an elastic bellows 30 or gasket. Tub 12 preferably comprises two complementary hemi-shells 38, 40 structured for being reciprocally coupled to form tub 12. The bottom region of tub 12 preferably comprises a seat or sump, suitable for receiving a heating device. The heating device, when activated, heats the liquid inside sump.

A water supply circuit 42 which can be built according to the known art is preferably arranged at the upper part of the laundry washing machine 2 and is suited to supply water into tub 12. It advantageously comprises at least one supply valve which is properly controlled, opened and closed, during the washing cycle. In the present embodiment, water supply circuit 42 comprises two supply valves 44, 46. The laundry washing machine 2 preferably comprises a detergent supplier 48 to supply detergent into tub 12 and a rinse additive supplier 50.

Laundry treatment machine 2 comprises on its frontal side a removable drawer 54 of which detergent supplier 48 and rinse additive supplier 50 are a part of. Drawer 54 is preferably provided with various compartments suited to be filled with washing products, especially a detergent, and at least one a rinse additive, especially a fabric softener. Laundry treatment machine 2 further comprises a front panel 60 with a user interface 62, preferably comprising indicators for the current state of the machine and/or user elements. Front panel 60 further comprises a user element 64 for interacting with the machine which is preferably built as a rotatable push button.

In the preferred embodiment here illustrated, the water is supplied into the tub 12 from the water supply circuit 42 by making it flow through the drawer 54 and then through a supply pipe (not shown). The water which reaches the tub 12 can, in this case, selectively contain one of the products contained in the compartments of the drawer 54. Such water can be clean if the product in the drawer 54 has been already removed.

In an alternative embodiment of the invention, a further separate water supply pipe can be provided, which supplies exclusively clean water into the tub 12, thus bypassing the compartments of the drawer 54.

The water supply circuit 42 also preferably comprises a water flow sensor, for example a flow meter, which makes it possible to calculate the quantity of water supplied into the tub 12. The supply pipe is preferably arranged laterally with respect to the tub 12 and preferably terminates at an upper region 66 of the tub 12. More preferably, the supply pipe terminates at a rear side of the washing tub 12.

The water supply circuit 42 may then preferably comprise a water softening device for removal of calcium, magnesium and/or certain other metal cations in hard water before entering the tub. The water softening device advantageously comprises water softening agents for reducing the hardness degree of the water to be supplied to the washing tub. Furthermore, the water supply circuit 42 may comprise a regeneration-agent reservoir which is housed inside the casing and is structured for receiving salt or other regeneration agents for regenerating a water softening function of the water softening agents.

Laundry washing machine 2 advantageously comprises a water outlet circuit 70 suitable for withdrawing liquid from a bottom region of the tub 12. The water outlet circuit 70 preferably comprises a main pipe 74 connected to the bottom region of the tub 12, a draining pump 78 and an outlet pipe 79 ending outside the housing or casing 4.

The water outlet circuit 70 or draining circuit preferably further comprise a filter 80 or filtering device arranged between the main pipe 74 and the draining pump 78 in a filter seat 82. The filter 80, which is described in detail below, is adapted to retain all the undesirable bodies (for example buttons that have come off the laundry, coins erroneously introduced into the laundry washing machine, etc.). Filter 80 can preferably be removed, and then cleaned, through a gate or flap 90 placed advantageously on the front wall of the casing 4 of the laundry washing machine 2.

The main pipe 74 connects the bottom region of the tub 12 to the filter 80. An inlet end of the main pipe 74 is advantageously positioned at the lower point of the tub 12, more preferably at the lower point of the sump. An outlet end of the main pipe 74 is preferably connected to a front part of the filter 80.

The draining pump 78 is preferably connected to a rear part of the filter 80 and conveys the liquid to the outlet pipe 79 through an outlet. Activation of the drain pump 78 drains the liquid, i.e. dirty water or water mixed with washing and/or rinsing products, from the tub 12 to the outside.

Laundry washing machine 2 advantageously comprises a first recirculation circuit or mixing circuit. The mixing circuit is adapted to drain liquid from the bottom region of the tub 12 and to re-admit such a liquid (recirculated mixing liquid) into a first region of the tub 12, which corresponds substantially to the same bottom region of the tub 12. Preferably, the mixing circuit is adapted to drain liquid from the bottom of the sump and to re-admit such a liquid (recirculated mixing liquid) again into the sump. More preferably, the liquid is re-admitted again into the sump below the heating device. This mixing circuit preferably comprises a first recirculation pump 81, a first pipe 350 connecting the filter to the first recirculation pump and a second recirculation pipe advantageously provided with a terminal portion, or nozzle. The terminal portion advantageously ends inside the sump, as mentioned above.

The liquid from the bottom region of the tub 12 is conveyed again towards the bottom region of the tub 12 by activation of the first recirculation pump 81. Advantageously, the liquid from the bottom region of the tub 12 is conveyed towards the bottom region of the tub 12 in a gap between the tub 12 and the drum. In a further embodiment, not illustrated, the mixing circuit may comprise a dedicated pipe connecting the bottom region of the tub 12 to the recirculation pump; in this case the mixing circuit is advantageously completely separated from the water outlet circuit, i.e. completely separated from the filter 80 and the main pipe 74.

The mixing circuit (first recirculation circuit) is preferably realized for transferring a portion of a liquid from a bottom region of the tub to the same bottom region for mixing and/or dissolution of the products, as better described below. In general, the mixing circuit (first recirculation circuit) is preferably realized for transferring liquid from a bottom region of the tub and for re-admitting such a liquid into the washing tub such that at least a portion of the re-admitted liquid reaches the bottom region of the washing tub without entering the washing drum.

More preferably, the mixing circuit (first recirculation circuit) is preferably realized for transferring liquid from a bottom region of the tub and for re-admitting such a liquid into the washing tub such that all, or substantially all, the re-admitted liquid reaches the bottom region of the washing tub without entering the washing drum.

Laundry washing machine 2 preferably comprises a second recirculation circuit 120 adapted to drain liquid from the bottom region of the tub 12 and to re-admit such a liquid into a second region 66, or upper/higher region, of the tub 12. The second recirculation circuit 120 preferably comprises a second recirculation pump 102, a second pipe 124 connecting the filtering device 80 to the second recirculation pump 102 and a second recirculation pipe 130, preferably provided with a terminal nozzle 132 arranged preferably at the upper region 66 of the tub 12. The terminal nozzle 132 is opportunely arranged so that the liquid is sprayed directly into the drum 14. More preferably, the terminal nozzle 132 is integrally formed in the bellows 30, and the liquid is therefore advantageously sprayed in a direction the center of the perforated drum 14. The terminal nozzle 132, therefore, enhances distribution of liquid over the laundry through the perforated drum 14.

The liquid from the bottom region of the tub 12 is conveyed towards the upper region 66 of the tub 12 by activation of the second recirculation pump 102. The second recirculation circuit 120 is advantageously activated in order to improve wetting of the laundry inside the drum 14 and for reducing the water required in the whole washing program. In general, the second recirculation circuit 120 is properly realized for transferring a portion of a liquid from a bottom region of the tub 12, preferably from the sump, to an upper region 66 of the tub 12 in order to enhance absorption of the liquid by the laundry.

Advantageously, laundry washing machine 2 comprises a device suited to sense (or detect) the liquid level inside the tub 12. The sensor device preferably comprises a pressure sensor which senses the pressure in the tub 12. From the values sensed by the sensor device it is possible to determine the liquid level of the liquid inside the tub 12. In another embodiment, not illustrated, laundry washing machine 2 may preferably comprise (in addition to or as a replacement of the pressure sensor) a level sensor (for example mechanical, electro-mechanical, optical, etc.) adapted to sense (or detect) the liquid level inside the tub 12.

Laundry washing machine 2 comprises a control unit 150, connected to the various parts of the laundry washing machine 2 in order to ensure its operation. The control unit 150 is preferably connected to the water inlet or supply circuit 42, the water outlet circuit, the recirculation circuits, the heating device and the electric motor and receives information from the various sensors provided on the laundry washing machine 2, like possibly the pressure sensor, a temperature sensor, etc.

The user interface 60 is connected to the control unit 150, accessible to the user and by means of which the user may select and set the washing parameters, like for example a desired washing program. Usually, other parameters can optionally be inserted by the user, for example the washing temperature, the spinning speed, the load in terms of weight of the laundry to be washed, etc. Based on the parameters acquired by said interface 60, the control unit sets and controls the various parts of the laundry washing machine 2 in order to carry out the desired washing program.

In FIG. 4, the filter 80 is shown in a perspective view. Filter 80 comprises a housing or filter body 160 which is built in a monolithic way with two hemi-shells 162, 164 which are connected to each other by two deformable elements 166, 168 which are built as lips. Each hemi-shell 162, 164 essentially has the shape of half of a hollow cylinder. Hemi-shells 162, 164 and deformable elements 166, 168 are built in a one-piece design which means that one of these components is a separate part which is connected to the other components in a detachable or non-detachable way. All these parts are preferably manufactured simultaneously in the same process, for instance in a molding process.

In FIG. 5, filter 80 is displayed with its body 160 in a closed configuration. A rim portion 230 arranged at end 182 of filter body 160 is built to be connected to the cap 184 (see FIG. 4). The deformable elements 166, 168 are preferably built in such a way that the hemi-shells 162, 164 can be brought into a closed configuration as displayed in FIG. 5 and can be brought into the open configuration as displayed in FIG. 4 in which the opening angle between them is 180°. In this way, convenient access to the interior of the filter body 160 is provided. Moreover, thanks to the simple "open shape" of each of the hemi-shells 162, 164, avoiding as much as possible the presence of an undercut, the manufacturing method is simplified and for the molding process simple molds can be employed.

In hemi-shell 164, an inlet port 170 is provided for connection to the outer duct 74. The suction port 170 is essentially built as an opening in hemi-shell 164. In hemi-shell 162, a suction port 188 is provided which is essentially built as an opening in hemi-shell 162. The suction port 172 is in fluid communication with the discharge pump 78; even if the filter seat 82 is provided with two other two out-let/suction ports/pipes (350 for the first recirculation pump 81 and 382 for the second recirculation pump 102), the filter body 160 is provided with the outlet 188 only, since in front of the outlet/suction ports/pipes 350, 352 the recesses 240, 246 are provided.

Both hemi-shells 162, 164 on their inside are built with a labyrinth 172. 180 or labyrinth-structure 172, 180. As can be seen in FIG. 4, almost all external surfaces of both hemi-shells 162, 164 are perforated, with the exception of the areas where the recesses 240, 246 are provided. In this way, that the water passing through the inlet 170 and entering into the internal chamber of the closed filter body 160 has to pass through the perforated walls to pass through the recirculation pump inlets 350, 382, allowing the filtration of the water flowed by said pumps.

On the other hand, the water flowing toward the suction port 188 in water flowing direction 174 has to pass through a labyrinth formed by the internal walls of the recesses 240, 246 and by the internal lip of port 172, assuring a filtration degree also for the water flowing toward the discharge pipe.

Attached to filter body 160 on an end 182 of filter body 160 is a cap 184 or cover to which a handle 186 is attached or built integrally with the cap 184. At the opposing end 174, in proximity of the suction port 188, an integrated disk 190 is provided which preferably is made of deformable/elastic material and therefore is flexible. The disk 190 is preferably integrated with the hemi-shell 162.

A safety collar 194 is preferably arranged in the suction port 188, preferably arranged on the integrated disk 190, which has a diameter that is smaller than the diameter of the integrated disk. The safety collar 184, which preferably protrudes from integrated disk 190 perpendicular, prevents the entry of elongated bodies into inlet of filter 80. In axial direction 174, it is preferably arranged in front of suction port 172 and thereby prevents elongated bodies to be sucked in by a suction pump.

On hemi-shell 164, at an outer border rim 200, two closure teeth 204 are arranged which in a closed configuration of filter body 160 engage with a corresponding teeth seat 208 which are arranged on a rim 210 of hemi-shell 162. Preferably, closure teeth 204 and seats 208 engage with each other in a snap connection.

On rim 210 of hemi-shell 162, a handle 220 is arranged which is especially useful during opening and closing of filter body 160. For convenient handling, handle 220 preferably comprises at least on one side a corrugated surface.

Figure 7:
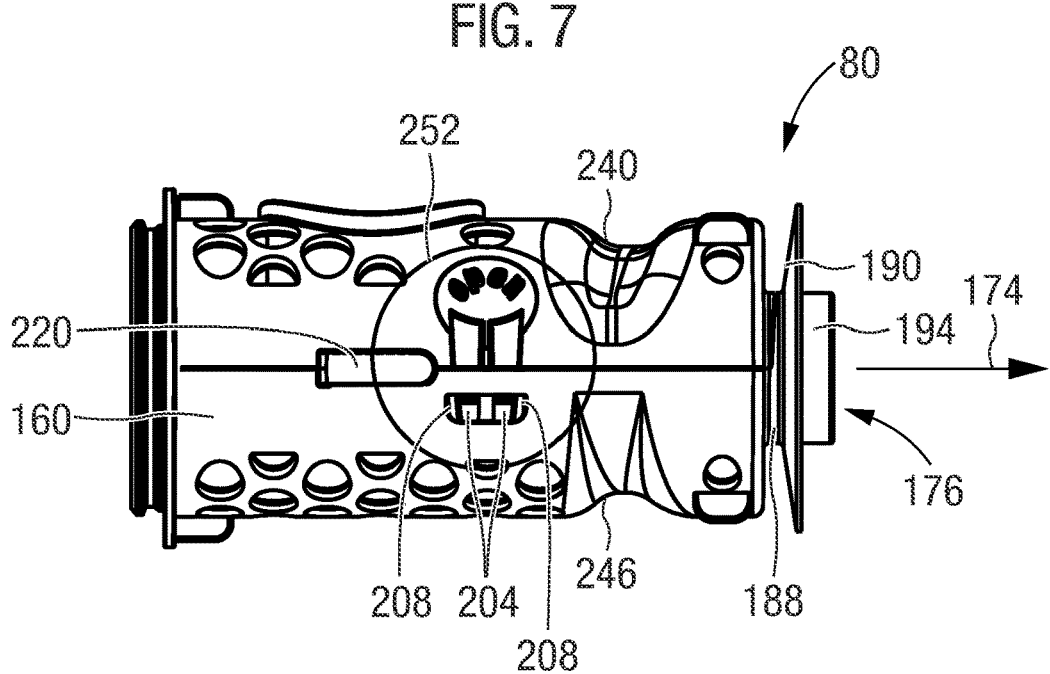
FIG. 7 shows the filter according to FIG. 4 in a side view.

In front of outlet port 350, a first recess 240 is provided in hemi-shell 164. In hemi-shell 162, in front of outlet port 382, a second recess 246 is provided. As can be seen in FIG. 7, the two recesses 240, 246 viewed in axial direction 174 are preferably arranged, at least approximately, at the same distance from end 176 of filter body 160. Due to the recesses 240, 246, the filter body in its cross section narrows down and then extends again. These recesses 240, 246 improve the fluid flow inside filter body 160. Preferably no apertures for the liquid passage are provided on these two recesses 240, 246. The presence of the recesses 240, 246 associated with a non-perforated area allows the water flowing in front of the recirculating pump inlets 350, 382 to deviate toward said inlets decreasing the liquid turbulence.

Figure 8:
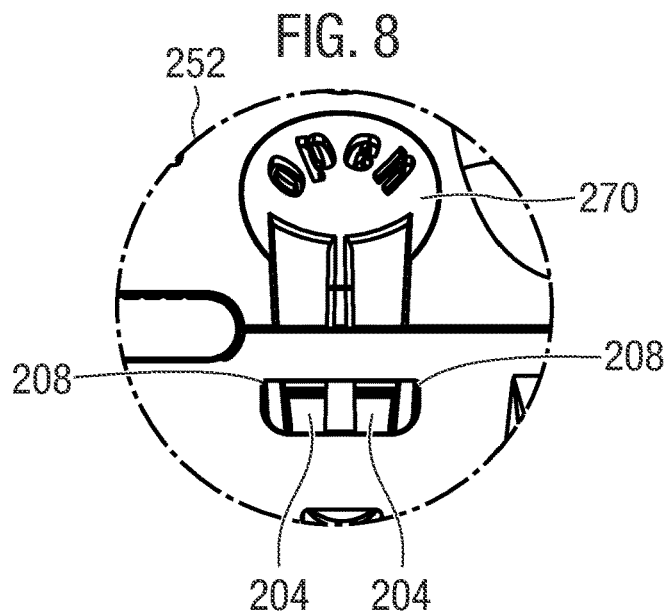
FIG. 8 shows a magnified view of the filter according to FIG. 7.

In FIG. 8, an enlarged view 252 of FIG. 7 is shown. In FIG. 8, the two closure teeth 204 are shown in their engaged state in the seat 208. An opening element 270 is provided which can be pressed in order to release teeth 204 from seats 208. When the user exerts pressure with his finger on an area of the opening element 270, a pulling on the handle 220 can facilitate the filter body aperture.

Figure 9:
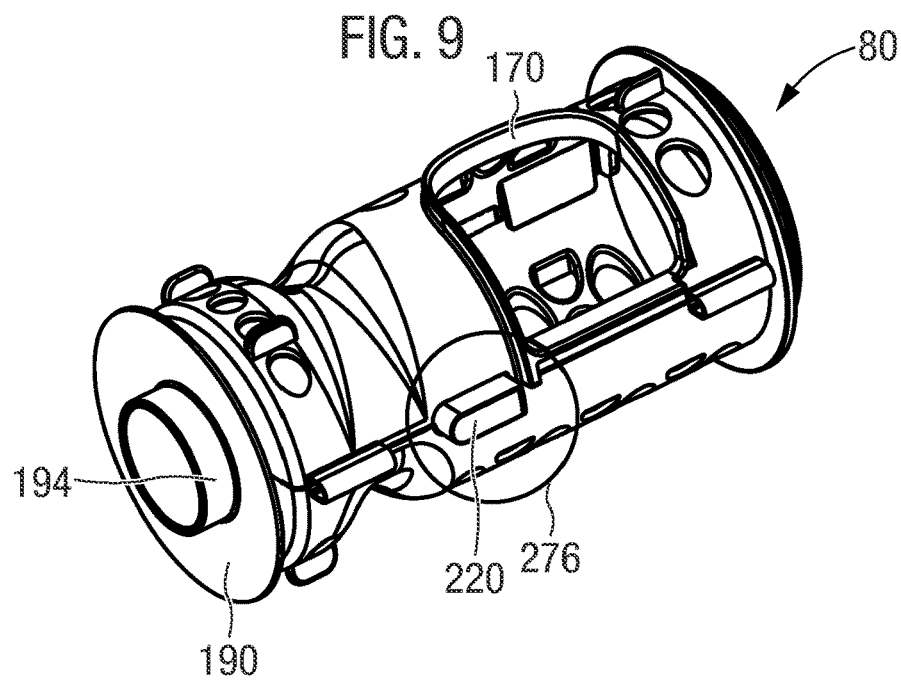
FIG. 9 shows the filter in a perspective view.
Figure 10:
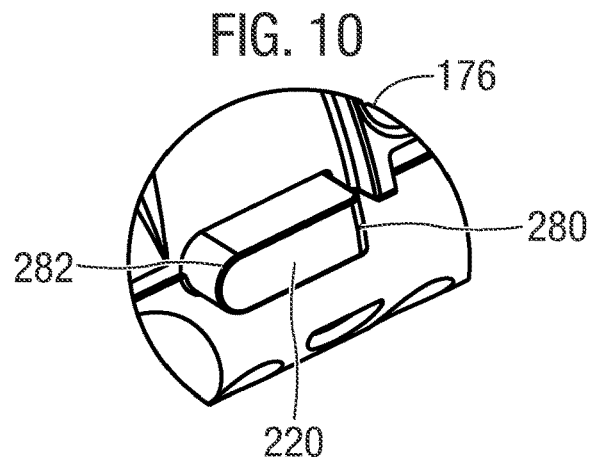
FIG. 10 shows a magnified view of the filter according to FIG. 9.

In FIG. 10, an enlarged view 276 of FIG. 9 is shown in which the handle 220 is shown. As can be seen in this enlarged view, handle 220 comprises a rounded end 282 and a straight or rectangular end 280. This design allows a good handling allows its insertion on a groove internally provided on the filter seat 82 to angularly positioning the filter body 160.

Figure 11:
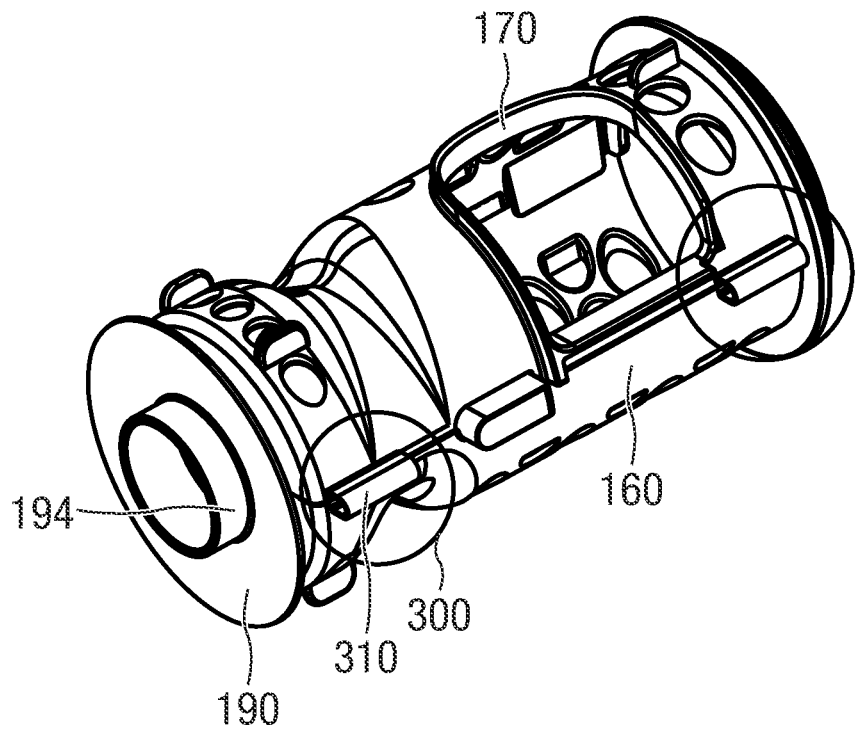
FIG. 11 shows the filter in a perspective view.
Figure 12:
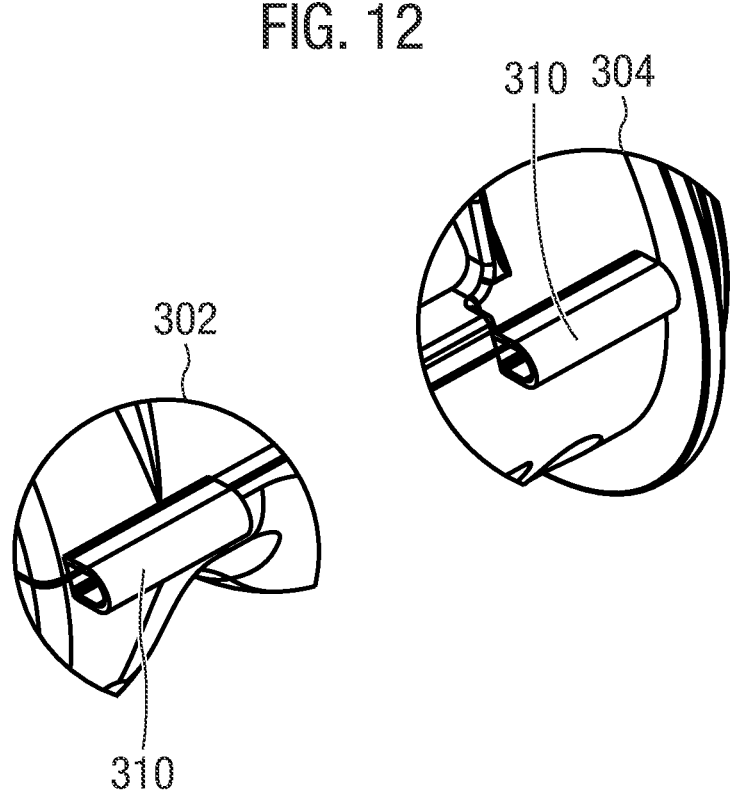
FIG. 12 shows two magnified views of the filter according to FIG. 11.
Figure 13:
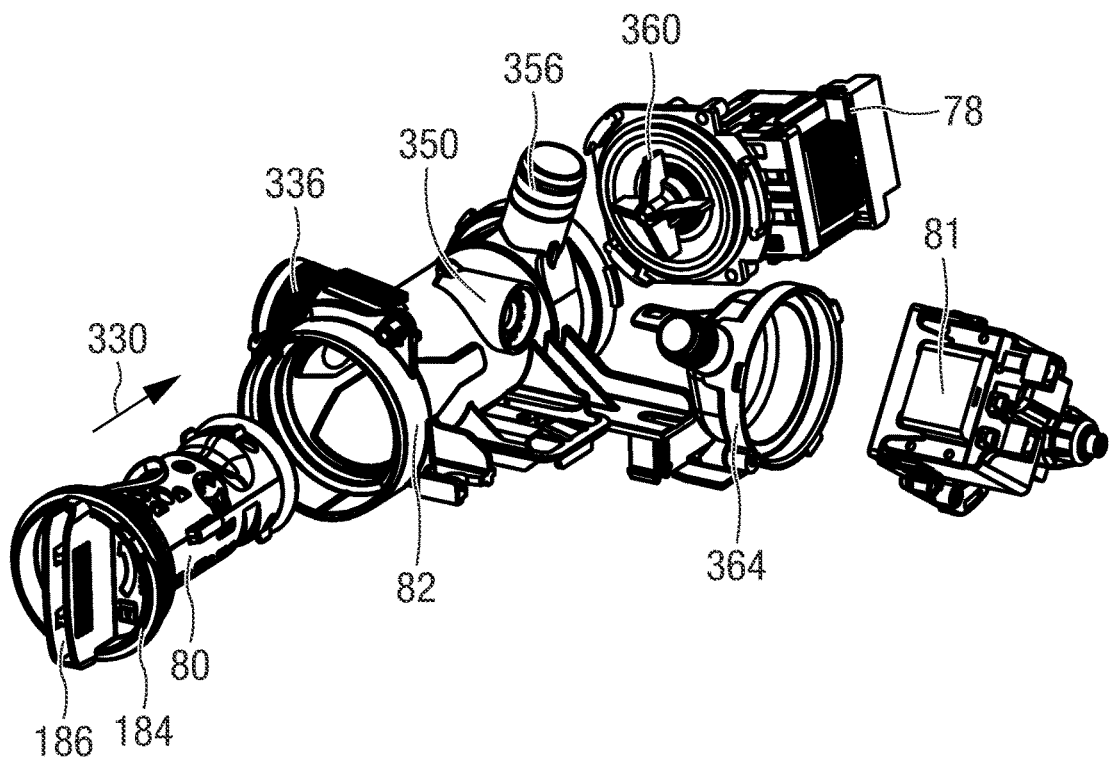
FIG. 13 shows the filter and parts of the laundry washing machine in an exploded view.
Figure 14:
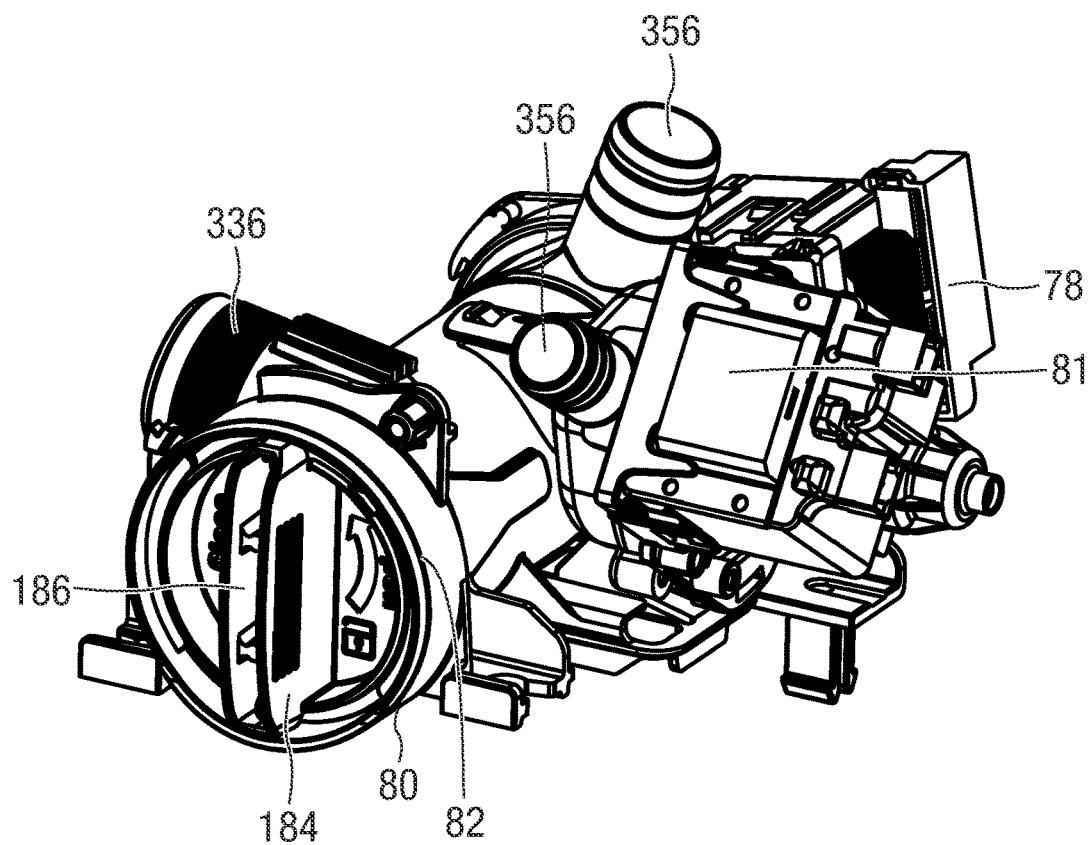
FIG. 14 shows the filter and the components according to FIG. 13 in an assembled configuration.
Figure 15:
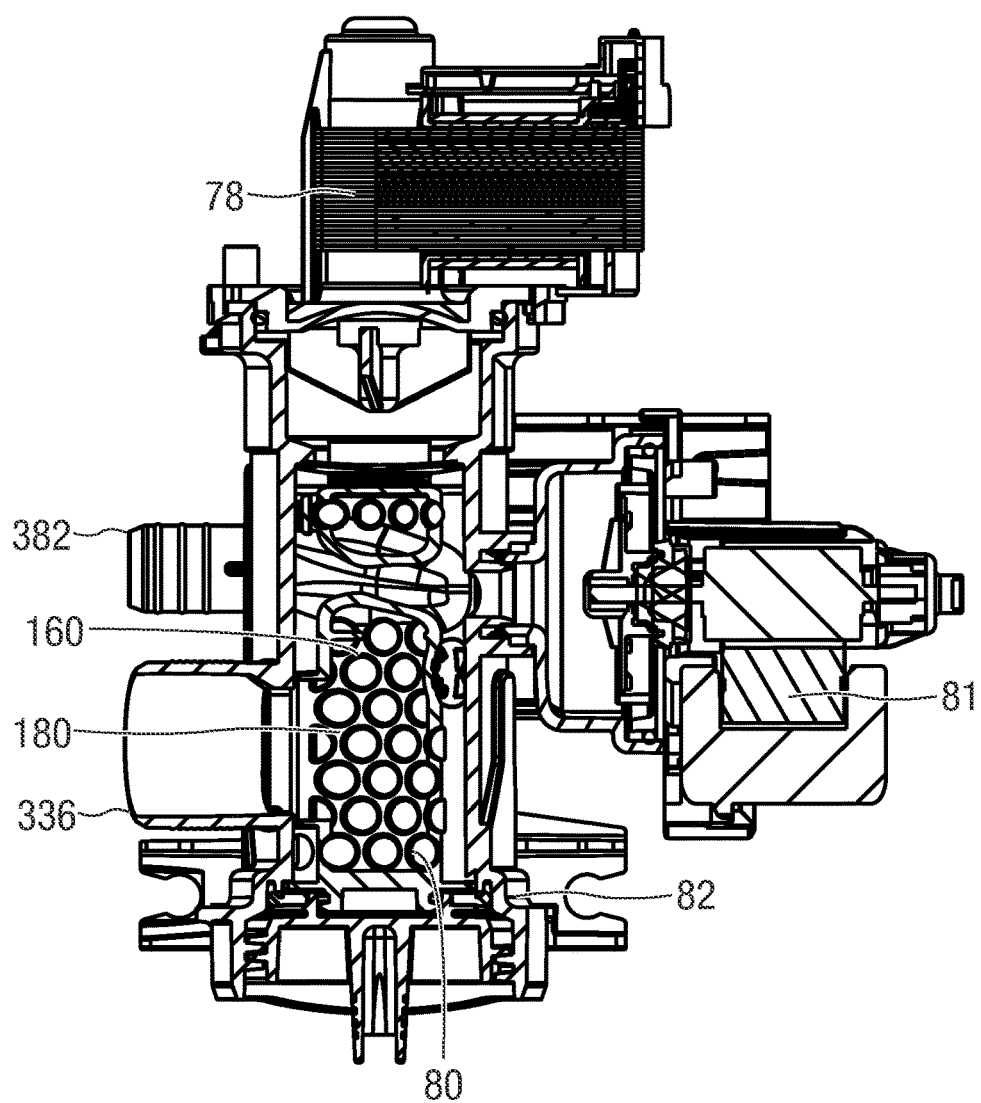
FIG. 15 shows the filter and the components as in FIG. 14 in a sectional view.
Figure 16:
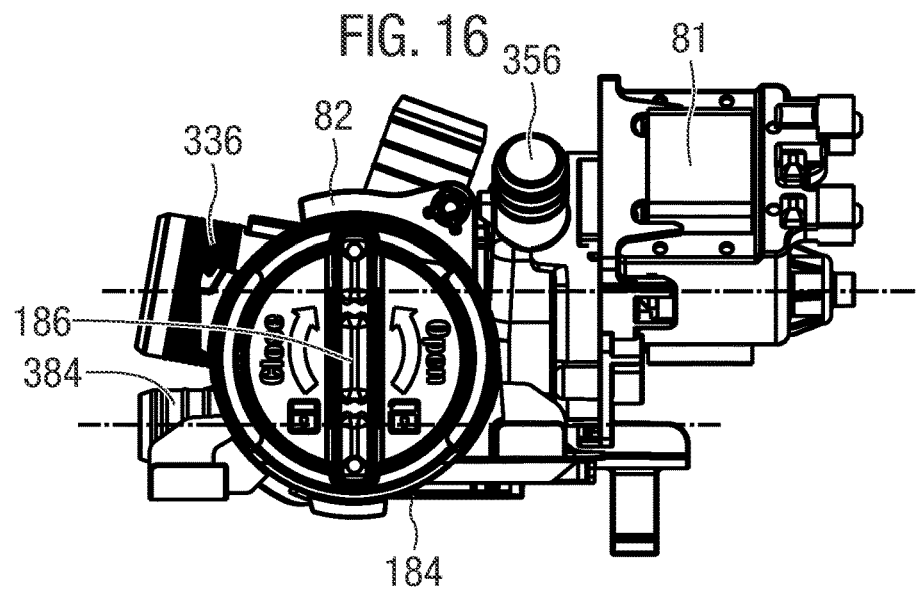
FIG. 16 shows the filter and the components as in FIG. 14 in a frontal view.

FIG. 12 shows two enlarged views 302, 304 of a selected region 400 of FIG. 11 in which lips 166, 168 are shown in respective bent configurations In FIGS. 13-16, the filter seat 82, the filter 80 and other components of laundry washing machine 2 are shown. Filter 80 is inserted into filter seat 82 in an insertion direction 330. Filter seat 82 comprises a socket 336 to which the main pipe 74 is connected and which allows liquid to enter filter body 160 through suction port 170.

The invention claimed is:

1. A laundry washing machine comprising:
   a washing tub;
   a drum configured for receiving laundry arranged in the washing tub;
   a filter comprising a filter seat and a filter body configured to be inserted in a first direction into the filter seat, the filter seat comprising a first outlet port and a second outlet port, each outlet port extending laterally to the first direction; and
   an outlet duct fluidly connecting the washing tub to the filter;
   wherein the filter body comprises a one-piece monolithic body with two hemi-shells, each hemi-shell having an external surface, and at least one deformable connection joining the two hemi-shells, wherein the external surface of the first hemi-shell comprises a first recess facing the first outlet port and the external surface of the second hemi-shell comprises a second recess facing the second outlet port when the filter body is inserted into the filter seat.

2. The laundry washing machine according to claim 1, wherein the at least one deformable connection element is shaped as a lip.

3. The laundry washing machine according to claim 1, wherein the at least one deformable connection element comprises two lips, each of the two lips being located a respective opposing axial end of the hemi-shells.

4. The laundry washing machine according to claim 1, wherein the monolithic body is made of plastic.

5. The laundry washing machine according to claim 1, wherein each of the two hemi-shells comprises at least a first closure on a first one of the hemi-shells, and at least a second closure on a second one of the hemi-shells, and therein the first closure and the second closure are configured to interact to hold the hemi-shells in a closed position.

6. The laundry washing machine according to claim 1, wherein the filter seat comprises a third outlet port in fluid communication with a suction port of a pump, and an end of the filter body facing the suction port comprises an integrated disk extending around an outer perimeter of the outlet port.

7. The laundry washing machine according to claim 6, wherein the integrated disk comprises a flexible material.

8. The laundry washing machine according to claim 1, wherein the filter seat comprises a third outlet port in fluid communication with a suction port of a pump, and an end of the filter body facing the outlet port comprises a safety collar configured to extend into the outlet port.

9. The laundry washing machine according to claim 1, wherein the filter seat comprises a third outlet port in fluid communication with a suction port of a pump, and an end of the filter body facing the suction port comprises an integrated disk extending around an outer perimeter of the outlet port and a safety collar configured to extend into the outlet port, wherein the safety collar protrudes from the integrated disk in an axial direction.

10. The laundry washing machine according to claim 1, wherein the first recess extends into the external surface of the first hemi-shell and the second recess extends into the external surface of the second hemi-shell.

11. The laundry washing machine according to claim 1, wherein the filter body comprises a cylindrical shape surrounding a cylindrical axis when the two hemi-shells are connected to each other.

12. The laundry washing machine according to claim 11, wherein the first recess comprises a portion of an external wall of the first hemi-shell that is closer to the cylindrical filter body axis than the rest of the external wall and the second recess comprises a portion of an external wall of the second hemi-shell that is closer to the cylindrical filter body axis than the rest of the external wall.

13. The laundry washing machine according to claim 1, wherein the laundry washing machine further comprises a first recirculation pump and a second recirculation pump, and wherein the first outlet port is fluidly connected to the first recirculation pump, and the second outlet port is fluidly connected to the second recirculation pump.

14. The laundry washing machine according to claim 1, wherein the filter comprises a cap that is rotatably connected to the filter body and configured to connect the filter body to the filter seat.

15. The laundry washing machine of claim 1, wherein each of the external surfaces are perforated with the exception of areas where the first recess and the second recess are provided.

16. The laundry washing machine of claim 1, wherein the first recess and the second recess are arranged at the same distance from an end of the filter body.

17. A filter for filtering contaminants from liquid in a laundry washing machine, the filter comprising a filter body with a filter inlet and a filter outlet, wherein the filter body comprises a one-piece monolithic body with two hemi-shells, each hemi-shell having an external wall, and at least one deformable connection joining the two hemi-shells, wherein the external wall of the first hemi-shell comprises a first recess extending therein and the external wall of the second hemi-shell comprises a second recess extending therein.

18. The filter of claim 17, wherein each of the external walls are perforated with the exception of areas where the first recess and the second recess are provided.

19. The filter of claim 17, wherein the first recess and the second recess are arranged at the same distance from an end of the filter body.

\* \* \* \* \*